US010965067B2

(12) United States Patent
Bucher (10) Patent No.: US 10,965,067 B2
(45) Date of Patent: *Mar. 30, 2021

(54) PLUG AND RECEPTACLE ASSEMBLY HAVING A THERMALLY CONDUCTIVE INTERFACE

(71) Applicant: TE Connectivity Services GmbH, Schaffhausen (CH)

(72) Inventor: Alan Weir Bucher, Manheim, PA (US)

(73) Assignee: TE CONNECTIVITY SERVICES GmbH, Schaffhausen (CH)

( * ) Notice: Subject to any disclaimer, the term of this patent is extended or adjusted under 35 U.S.C. 154(b) by 70 days.

This patent is subject to a terminal disclaimer.

(21) Appl. No.: 15/888,640

(22) Filed: Feb. 5, 2018

(65) Prior Publication Data

US 2018/0159279 A1  Jun. 7, 2018

Related U.S. Application Data

(63) Continuation of application No. 14/242,543, filed on Apr. 1, 2014, now Pat. No. 9,912,107.

(51) Int. Cl.
*H01R 13/66* (2006.01)
*H01R 12/71* (2011.01)
*H01R 24/60* (2011.01)
*G02B 6/42* (2006.01)

(52) U.S. Cl.
CPC ......... *H01R 13/665* (2013.01); *G02B 6/4246* (2013.01); *G02B 6/4261* (2013.01); *G02B 6/4269* (2013.01); *H01R 12/716* (2013.01); *H01R 24/60* (2013.01)

(58) Field of Classification Search
CPC .... H01R 24/60; H01R 12/716; H01R 13/665; G02B 6/4269; G02B 6/4261; G02B 6/4246
USPC .................... 439/485, 487; 361/679.54, 704
See application file for complete search history.

(56) References Cited

U.S. PATENT DOCUMENTS

| 4,448,240 A | 5/1984 | Sharon |
| 4,498,530 A | 2/1985 | Lipschutz |
| 4,535,841 A | 8/1985 | Kok |
| 4,770,242 A | 9/1988 | Dailkoku et al. |
| 4,800,956 A | 10/1989 | Hamburgen |
| 5,052,481 A | 10/1991 | Horvath et al. |

(Continued)

OTHER PUBLICATIONS

Endres "Key Factors and Guidelines for Designing SFP Cage Cooling Systems," Molex Incorporated,; 2012; 2 pages.

(Continued)

*Primary Examiner* — Renee S Luebke
*Assistant Examiner* — Paul D Baillargeon (57) ABSTRACT

Plug assembly including a pluggable connector having a mating end and a trailing end and a central axis extending therebetween. The pluggable connector includes internal electronics that generate thermal energy within the pluggable connector. The mating end is configured to engage a data connector. The pluggable connector also includes a thermal interface region that is coupled to the pluggable connector. The thermal interface region includes a series of transfer plates that extend parallel to each other and to the central axis. The transfer plates define a series of plate-receiving slots extending parallel to the central axis. The thermal interface region transfers the thermal energy generated by the internal electronics through the transfer plates.

20 Claims, 4 Drawing Sheets

(56) References Cited

U.S. PATENT DOCUMENTS

| | | |
|---|---|---|
| 5,083,373 A | 1/1992 | Hamburgen |
| 5,787,976 A | 8/1998 | Hamburgen et al. |
| 5,838,065 A | 11/1998 | Hamburgen et al. |
| 6,009,938 A | 1/2000 | Smith et al. |
| 6,034,430 A | 3/2000 | Hamburgen et al. |
| 6,396,693 B1 | 5/2002 | Shih |
| 6,587,338 B2 | 7/2003 | LaCroix et al. |
| 6,602,091 B2 | 8/2003 | Belady et al. |
| 6,604,575 B1 | 8/2003 | Degtiarenko |
| 6,793,517 B2 | 9/2004 | Neer et al. |
| 6,816,376 B2 | 11/2004 | Bright et al. |
| 6,866,544 B1 | 3/2005 | Casey et al. |
| 6,980,437 B2 | 12/2005 | Bright |
| 6,986,679 B1 | 1/2006 | Aronson et al. |
| 7,287,916 B2 | 10/2007 | Mizue |
| 7,317,617 B2 | 1/2008 | Meadowcroft et al. |
| 7,355,857 B2 | 4/2008 | Pirillis et al. |
| 7,371,965 B2 | 5/2008 | Ice |
| 7,489,513 B2 | 2/2009 | Lai et al. |
| 7,625,223 B1 | 12/2009 | Fogg |
| 8,104,977 B2 | 1/2012 | Sone et al. |
| 8,164,922 B2 | 4/2012 | Kim |
| 8,200,097 B2 | 6/2012 | Cole |
| 8,599,559 B1 | 12/2013 | Morrison et al. |
| 8,613,632 B1 | 12/2013 | Nichols |
| 8,760,870 B2 | 6/2014 | Yamamoto |
| 8,817,469 B2 | 8/2014 | Macall |
| 8,879,262 B2 | 11/2014 | Shi |
| 8,939,658 B2 | 1/2015 | Heimbuch et al. |
| 9,039,303 B2 | 5/2015 | Wang et al. |
| 9,042,096 B2 | 5/2015 | Thomas et al. |
| 9,055,694 B2 | 6/2015 | Lima |
| 9,063,308 B2 | 6/2015 | Heimbuch et al. |
| 2003/0058617 A1 | 3/2003 | LaCroix et al. |
| 2011/0110048 A1 | 5/2011 | Lima |
| 2012/0293952 A1 | 11/2012 | Herring et al. |
| 2013/0033821 A1 | 2/2013 | Szczensy et al. |
| 2013/0065414 A1 | 3/2013 | Yu et al. |
| 2013/0306293 A1 | 11/2013 | Gard et al. |

OTHER PUBLICATIONS

Molex "Quad Small Form-factor Pluggable Plus (QSFP+) Interconnect Solution," 2011; 14 pages.
Cisco 40GBASE QSFP Modules; Cisco; 2015; 13 pages.
Data and Devices—High Speed Input/Output Solutions; TE Connectivity; 2015; 7 pages.
Thermal Management at the Faceplate White Paper; OIF Optical Internetworking Forum; 2012; 27 pages.
I/O Products; Molex; 2010; 16 pages.
Adapting Data Centers Using Fan-Out Technology; IXIA; 2013; 22 pages.
Specification for QSEP+ 10 Gbs 4X Pluggable Transceiver; Electronic Industries Alliance; Oct. 31, 2013; 88 pages.
Specification for QSFP+ 4X 10 Gb/s Pluggable Transceiver Solution (QSFP10); SFF; Jul. 29, 2015; 12 pages.
International Search Report dated Jun. 11, 2015 for International Application No. PCT/US2015/022196; 4 pages.
Seaman et al. "Carbon Velvet Thermal Interface Gaskets"Paper for the 39th AIAA Aerospace Sciences Meeting, Session: Spacecraft Thermal Control and Technology, Reno, Nevada, Jan. 2001; 4 pages.

PLUG AND RECEPTACLE ASSEMBLY HAVING A THERMALLY CONDUCTIVE INTERFACE

RELATED APPLICATIONS

The present application is a continuation of U.S. application Ser. No. 14/242,543 (U.S. Pat. Appl. Publ. No. 2015/0280368 A1), filed on Apr. 1, 2014, which is incorporated herein by reference in its entirety.

BACKGROUND

The subject matter herein relates generally to a plug and receptacle assembly having a thermally conductive interface for transferring heat from the plug to an external environment.

Plug assemblies may be used to transmit data to and from different communication systems or devices. The plug assemblies typically include two or more pluggable connectors that are interconnected through one or more communication cables. The data may be transmitted through the communication cable(s) in the form of optical signals and/or electrical signals. Each pluggable connector includes a mating end that is inserted into a receptacle assembly and a trailing end that is coupled to the corresponding communication cable. In some cases, the pluggable connector includes a circuit board that has electrical contacts, such as contact pads, that are exposed at the mating end. During a mating operation, the mating end is inserted into a cavity of the receptacle assembly and advanced in a mating direction until the mating end engages another connector within the cavity. The electrical contacts at the mating end engage corresponding electrical contacts of the other connector within the cavity.

A common challenge for communication systems is managing heat that is generated within the communication system. In the case of the plug assembly described above, the pluggable connector includes internal electronics that generate heat during operation of the plug assembly. The pluggable connector includes a heat block that absorbs heat from the internal electronics and transfers the heat to an exterior of the pluggable connector. For example, when the pluggable connector is inserted into the receptacle assembly, the heat block engages another heat block of the receptacle assembly. As such, heat generated within the pluggable connector may be transferred to the receptacle assembly and then dissipated therefrom.

The heat blocks of the pluggable connector and the receptacle assembly generally include planar surfaces that intimately engage each other along a contact area. To improve heat transfer between the two planar surfaces, the planar surfaces may be finished or smoothed to increase the contact area between the planar surfaces. In addition, a normal force may be imposed that pushes the planar surface of one heat block into the planar surface of the other heat block. While it is desirable to have this intimate engagement between the planar surfaces, it is also desirable for the pluggable connector to be inserted into and withdrawn from the receptacle assembly multiple times. However, the friction generated between the planar surfaces may cause wear and/or damage to the pluggable connector or the receptacle assembly. Even with smooth planar surfaces and a normal force that presses the planar surfaces into each other, the heat transfer between the planar surfaces may be insufficient for certain applications.

Accordingly, there is a need for a plug and receptacle assembly having a thermally conductive interface which provides desirable heat transfer while minimizing wear and damage to components.

BRIEF DESCRIPTION

In an embodiment, a plug assembly is provided that includes a pluggable connector having a mating end and a trailing end and a central axis extending therebetween. The pluggable connector includes internal electronics that generate thermal energy within the pluggable connector. The mating end is configured to engage a data connector. The pluggable connector also includes a thermal interface region that is coupled to the pluggable connector. The thermal interface region includes a series of transfer plates that extend parallel to each other and to the central axis. The transfer plates define a series of plate-receiving slots extending parallel to the central axis. The thermal interface region transfers the thermal energy generated by the internal electronics through the transfer plates.

In some embodiments, the transfer plates have exterior edges and leading edges. The leading edges may face in a direction along the central axis, and the exterior edges may extend parallel to the central axis. At least one of the exterior edges or the leading edges may be chamfered and configured to engage transfer plates of the receptacle assembly.

In an embodiment, a plug and receptacle assembly is provided that includes a plug assembly having a pluggable connector extending between a mating end and a trailing end. The plug assembly includes a thermal interface region coupled to the pluggable connector. The thermal interface region includes a series of spaced apart transfer plates that extend parallel to each other. The plug and receptacle assembly also includes a receptacle assembly having an assembly housing that includes a communication port and a housing cavity accessed through the communication port. The receptacle assembly includes a data connector disposed within the housing cavity and a heat sink coupled to the assembly housing. The heat sink includes a series of spaced apart transfer plates that extend parallel to each other. The transfer plates of the heat sink define a series of plate-receiving slots of the heat sink. The transfer plates of the thermal interface region are received by the plate-receiving slots of the heat sink. The transfer plates of the thermal interface region transfer thermal energy generated within the pluggable connector to the transfer plates of the heat sink.

In an embodiment, a receptacle assembly is provided that includes an assembly housing having a communication port and a housing cavity that is accessed through the communication port. The receptacle assembly also includes a data connector that is disposed within the housing cavity and positioned to engage a pluggable connector when the pluggable connector is inserted through the communication port along a mating axis. The receptacle assembly also includes a heat sink that is coupled to the assembly housing. The heat sink includes a series of transfer plates that extend parallel to each other and to the mating axis. The transfer plates define a series of plate-receiving slots that extend parallel to the mating axis. The heat sink is configured to transfer thermal energy from the pluggable connector through the transfer plates to an exterior space.

In some embodiments, the transfer plates may have port edges that face the communication port and cavity edges that extend parallel to the mating axis. At least one of the port edges or the cavity edges may be chamfered and configured to engage the pluggable connector.

DETAILED DESCRIPTION

Figure 1:
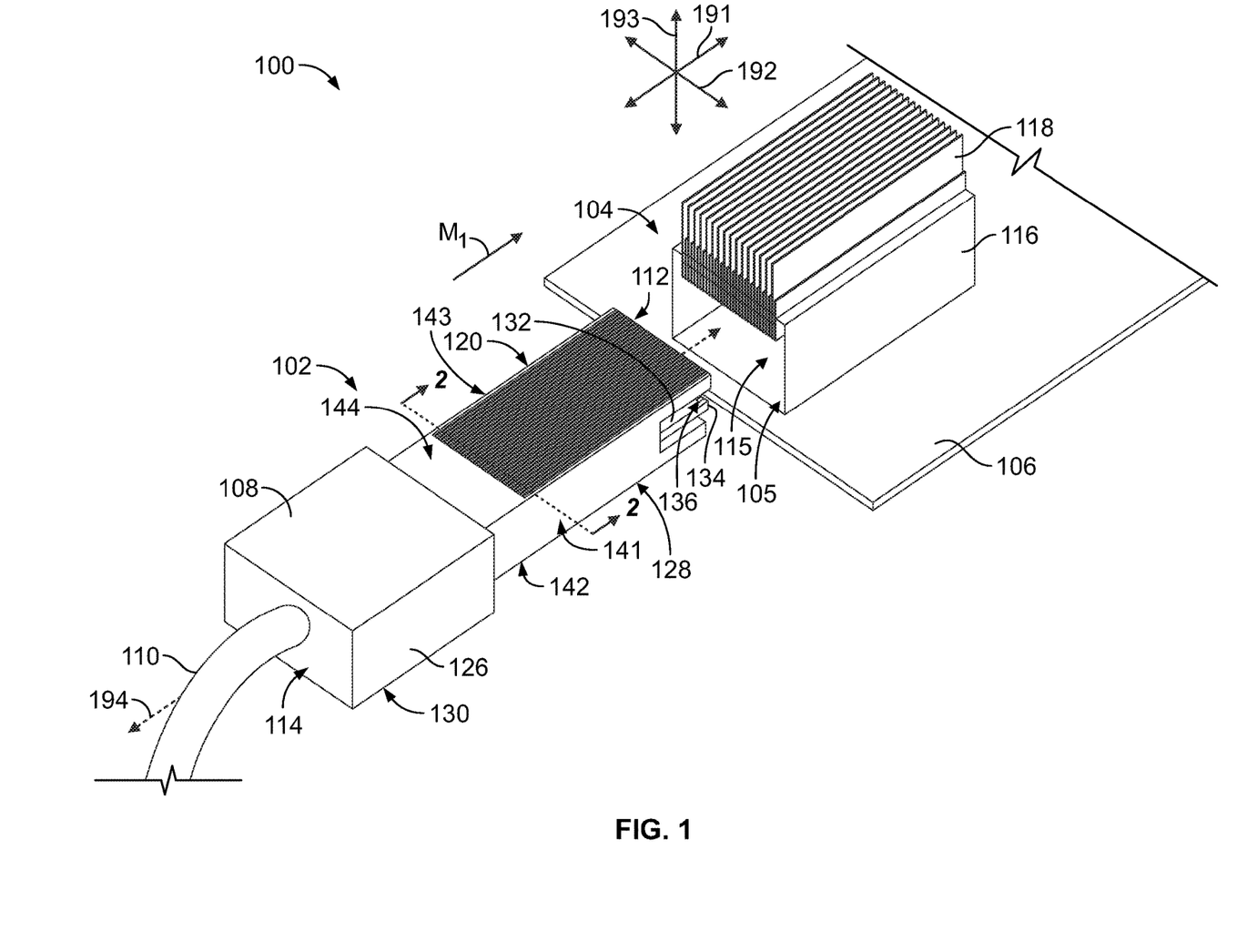
FIG. 1 is a perspective view of a plug and receptacle assembly formed in accordance with an embodiment.

FIG. 1 is a perspective view of a plug and receptacle assembly 100 formed in accordance with an embodiment that includes a plug assembly 102 and a receptacle assembly 104. The plug and receptacle assembly 100 may also be referred to as a communication system or assembly. The receptacle assembly 104 is mounted to a circuit board 106. The circuit board 106 may be, for example, a daughter card or a mother board. In the illustrated embodiment, the plug assembly 102 includes a pluggable connector 108 that is an input/output (I/O) module capable of repeatedly engaging the receptacle assembly 104. In FIG. 1, the plug and receptacle assembly 100 is oriented with respect to mutually perpendicular axes, including a mating axis 191, a lateral axis 192, and an elevation axis 193. Although the elevation axis 193 appears to extend parallel to the force of gravity in FIG. 1 with gravity pulling the receptacle assembly 104 toward the circuit board 106, it is understood that the plug and receptacle assembly 100 and its components may have other spatial orientations. For example, the lateral axis 192 may extend parallel to the force of gravity.

The plug assembly 102 includes a communication cable 110 that is coupled to a trailing end 114 of the pluggable connector 108. Although not shown, the plug assembly 102 may include another pluggable connector 108 at an opposite end of the communication cable 110. The pluggable connector 108 has a mating end or face 112 that is opposite the trailing end 114. A central axis 194 extends between the mating end 112 and the trailing end 114. The plug assembly 102 (or the pluggable connector 108) also includes a thermal interface region 120, which in some embodiments may be characterized as a heat sink. The receptacle assembly 104 has an assembly housing 116 and a heat sink 118. As described herein, the heat sink 118 and the thermal interface region 120 are configured to interface with each other to transfer thermal energy or heat 150 (shown in FIG. 2) away from the pluggable connector 108.

In some embodiments, the assembly housing 116 may be a receptacle cage that is stamped and formed from sheet metal. The assembly housing 116 defines a communication port 105 that provides access to a housing cavity 115 within the assembly housing 116. The communication port 105 and the housing cavity 115 are configured to receive a portion of the pluggable connector 108. For example, the mating end 112 of the pluggable connector 108 is configured to be inserted through the communication port 105 and into the housing cavity 115. To insert the mating end 112 into the housing cavity 115, the pluggable connector 108 is aligned with respect to the communication port 105 and the housing cavity 115 and advanced through the communication port 105 in a mating direction $M_1$. The mating direction $M_1$ is parallel to the mating axis 191. The mating end 112 is advanced toward a data connector 122 (shown in FIG. 3) that is disposed within the housing cavity 115. The pluggable connector 108 and the data connector 122 may form a pluggable engagement. When the pluggable connector 108 and the data connector 122 are operably engaged, the heat sink 118 and the thermal interface region 120 interface with each other to transfer the thermal energy 150 (FIG. 2) away from the pluggable connector 108.

The communication cable 110 is configured to transmit data signals therethrough. In an exemplary embodiment, the communication cable 110 includes optical fibers that are configured to transmit data signals in the form of optical signals. The optical fibers may interconnect with internal electronics 124 (shown in FIG. 2), such as a signal converter or optical engine. In other embodiments, the communication cable 110 includes insulated wires having jackets that surround wire conductors. The wire conductors may be configured to transmit electrical signals and/or electrical power. In such embodiments, the internal electronics 124 may be integrated circuits that are configured to, for example, amplify input electrical signals from the communication cable 110 and/or output electrical signals from the receptacle assembly 104.

In particular embodiments, the plug and receptacle assembly 100 is a high speed pluggable input/output (I/O) interconnect assembly. The plug and receptacle assembly 100, the plug assembly 102, and/or the pluggable connector 108 may be configured for various applications. Non-limiting examples of such applications include storage networking, cluster computing, high performance computing, and telecommunications. The plug and receptacle assembly 100, the plug assembly 102, and/or the pluggable connector 108 may be used with switches, hubs, storage systems, storage devices, adapters, controllers, network interface cards (NICs), servers, switches, host bus adapters (HBAs), and routers. By way of one example, the pluggable connector 108 and/or the receptacle assembly 104 may be or may be part of a quad small form-factor pluggable (QSFP) interconnect system, such as the QSFP+ system available from TE Connectivity. The plug and receptacle assembly 100 may be capable of achieving high data rates, such as data rates that exceed 20 gigabits per second (Gbs). The plug and receptacle assembly 100 may also be configured to satisfy various industry standards, such as Ethernet, Fibre Channel, and InfiniBand.

The pluggable connector 108 has a connector housing 126 that forms a connector cavity 138 (shown in FIG. 2) where the internal electronics 124 are located. The connector cavity 138 may open to the mating end 112. The connector housing 126 has a plug portion 128 that is sized and shaped to be inserted into the housing cavity 115 of the receptacle assembly 104 and a body portion 130 that is not inserted into the housing cavity 115. The plug portion 128 includes the mating end 112. The body portion 130 may be configured to be gripped by an individual and includes the trailing end 114.

Figure 2A:
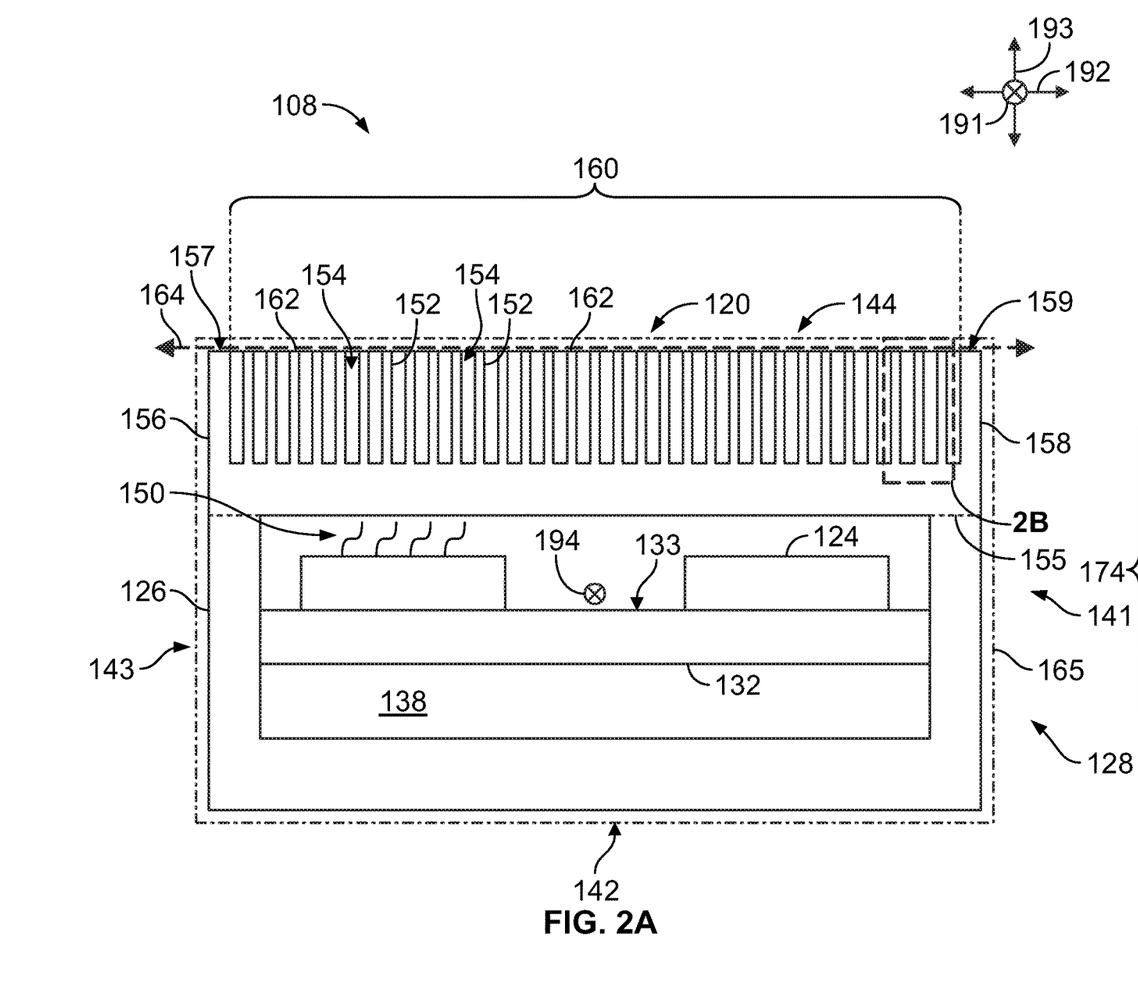
FIG. 2A is a cross-section of a pluggable connector formed in accordance with an embodiment taken along the line 2-2 in FIG. 1.
Figure 2B:
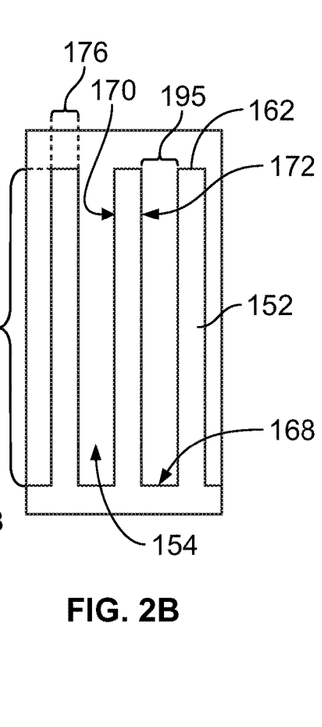
FIG. 2B is an enlarged cross-section of the pluggable connector in FIG. 2A.

In the illustrated embodiment, the pluggable connector 108 includes a circuit board 132 having a board edge 134 with electrical contacts 136. The circuit board 132 is disposed within the connector cavity 138 (FIG. 2). The electrical contacts 136 are configured to engage corresponding electrical contacts 182 (shown in FIG. 3) of the data connector 122 (FIG. 3) in the receptacle assembly 104. In some embodiments, the electrical contacts 136 are contact pads of the circuit board 132. In alternative embodiments, however, the electrical contacts 136 may be other types of electrical contacts, such as contact beams.

The plug portion 128 of the connector housing 126 includes plug sides 141, 142, 143, 144 that extend parallel to the central axis 194 and between the mating and trailing ends 112, 114. The plug sides 141, 143 face in opposite directions along the lateral axis 192 and extend longitudinally along the mating axis 191 between the body portion 130 and the mating end 112. The plug sides 142, 144 face in opposite directions along the elevation axis 193 and extend longitudinally along the mating axis 191 between the body portion 130 and the mating end 112. The plug sides 142, 144 extend laterally between the plug sides 141, 143. In the illustrated embodiment, the thermal interface region 120 defines a portion of the plug side 144. In other embodiments, the thermal interface region 120 may define a portion of the plug side 141, the plug side 142, or the plug side 143. In other embodiments, more than one of the plug sides 141-144 may include a thermal interface region. For example, each of the plug side 144 and the plug side 142 may include a separate thermal interface region.

Optionally, the pluggable connector 108 may include shield tabs or fingers (not shown) that encircle the plug portion 128 of the connector housing 126. The shield tabs may electrically couple the connector housing 126 to the assembly housing 116. As another option, the pluggable connector 108 may include a latching mechanism (not shown) that is configured to couple to the assembly housing 116 when the pluggable connector 108 and the receptacle assembly 104 are engaged. The latching mechanism may prevent inadvertent withdrawal of the pluggable connector 108.

FIG. 2 is a cross-section of the pluggable connector 108 illustrating the connector housing 126 and the connector cavity 138 within the connector housing 126. In particular, FIG. 2 illustrates a cross-section of the plug portion 128 of the connector housing 126 as viewed along the central axis 194 toward the mating end 112 (FIG. 1). In the illustrated embodiment, the pluggable connector 108 includes the circuit board 132 disposed within the connector cavity 138. The internal electronics 124 are located within the connector cavity 138 and coupled to the circuit board 132. More specifically, the internal electronics 124 are mounted to a board surface 133 of the circuit board 132. During operation of the pluggable connector 108, the internal electronics 124 may generate thermal energy 150 that is dissipated into the connector cavity 138 or through other portions of the pluggable connector 108, such as the connector housing 126. The thermal energy 150 may be absorbed by the thermal interface region 120 and transferred away from the connector cavity 138.

The internal electronics 124 may receive input data signals and process the input data signals to provide output data signals. In some embodiments, the internal electronics 124 may include integrated circuits, signal converters, optical engines, amplifiers, and the like. In certain embodiments, the internal electronics 124 include at least one signal converter that transforms input data signals having a first signal form to output data signals having a second signal form. The input and output data signals may be in the form of electrical signals or optical signals. As one example, the signal converter may transform incoming optical signals to outgoing electrical signals. In other embodiments, the internal electronics 124 may amplify the input data signals for transmission through the communication cable 110 (FIG. 1).

The thermal interface region 120 and the connector housing 126 may comprise a material having a suitable thermal conductivity for transferring heat away from the connector cavity 138 or, more specifically, the internal electronics 124 disposed within the connector cavity 138. The material may be, for example, a metal or polymer with metal fibers. As shown, the thermal interface region 120 includes a series of spaced apart transfer plates 152. In the illustrated embodiment, the thermal interface region 120 and the transfer plates 152 form part of the connector housing 126. In other embodiments, the thermal interface region 120 may be mounted to the connector housing 126. For example, a dashed line 155 represents an interface that may exist between the thermal interface region 120 and the connector housing 126. In such embodiments, the connector housing 126 may be an open-sided shell having the thermal interface region 120 mounted thereto to enclose the connector cavity 138. The thermal interface region 120 may be secured to the connector housing 126 using fasteners and/or an adhesive.

The transfer plates 152 extend parallel to each other and the central axis 194. The transfer plates 152 have leading edges (not shown) that face in the mating direction $M_1$ (FIG. 1) and are configured to enter the receptacle assembly 104 (FIG. 1). The transfer plates 152 define a series of plate-receiving slots 154 that extend parallel to the central axis 194. In an exemplary embodiment, the plate-receiving slots 154 are accessible through the mating end 112 (FIG. 1) and extend continuously from the mating end 112 toward the trailing end 114 (FIG. 1) along the central axis 194. As such, the plate-receiving slots 154 may receive transfer plates 202 (shown in FIG. 3) of the receptacle assembly 104 (FIG. 1) as the pluggable connector 108 is inserted into the housing cavity 115 (FIG. 1). The thermal interface region 120 is configured to transfer the thermal energy 150 generated by the internal electronics 124 through the transfer plates 152 and into the plate-receiving slots 154. The thermal energy 150 may then be absorbed by the transfer plates 202 and transferred away from the pluggable connector 108.

However, the plate-receiving slots 154 are not required to receive the transfer plates 202 of the receptacle assembly 104 as the pluggable connector 108 is inserted into the housing cavity 115. For example, in alternative embodiments, after the pluggable connector 108 is engaged with the data connector 122, the heat sink 118 may be moved (e.g., lowered) toward the thermal interface region 120. As the heat sink 118 is moved toward the thermal interface region 120, the transfer plates 202 may be inserted into the plate-receiving slots 154.

In the illustrated embodiment, the connector housing 126 includes a pair of sidewalls 156, 158 having respective top surfaces 157, 159. The sidewalls 156, 158 define a dissipation space 160 therebetween. The transfer plates 152 and the plate-receiving slots 154 are located within the dissipation space 160. Also shown, each of the transfer plates 152 has an exterior edge 162 that represents a distal edge of the transfer plates 152 located furthest from the connector cavity 138. The exterior edges 162 and the top surfaces 157, 159 may define the plug side 144 and extend parallel to the central axis 194. The plate-receiving slots 154 open to the plug side 144 to allow the transfer plates 202 (FIG. 3) to be inserted into the plate-receiving slots 154. In such embodiments, the transfer plates 202 may be inserted into the plate-receiving slots 154 through the mating end 112 (FIG. 1) in a direction along the mating axis 191 or through the plug side 144 in a direction along the elevation axis 193.

In the illustrated embodiment, the top surfaces 157, 159 and the exterior edges 162 may be substantially level or flush with respect to one another. More specifically, the top surfaces 157, 159 and the exterior edges 162 may be co-planar such that a single surface plane 164 coincides with the exterior edges 162 and the top surfaces 157, 159. In other embodiments, one or more of the exterior edges 162 may be located further away from the connector cavity 138 or may be located a depth within the dissipation space 160. In the illustrated embodiment, the sidewalls 156, 158 are wider or thicker than the transfer plates 152. The sidewalls 156, 158 may also comprise a different material. In some embodiments, the sidewalls 156, 158 may be configured to protect the transfer plates 152 from damage. In other embodiments, the sidewalls 156, 158 may also be transfer plates. For example, the sidewalls 156, 158 may have the same dimensions as the transfer plates 152 and/or comprise the same material as the transfer plates 152.

The plug sides 141-144 are substantially planar at the cross-section shown in FIG. 2. The plug sides 141-144 may define a cross-sectional envelope or profile 165. The cross-sectional envelope 165 is indicated by a dashed line in FIG. 2 that surrounds the plug connector 108. For illustrative purposes, the dashed line is separated from the plug sides 141-144 to indicate the general shape of the cross-sectional envelope 165. The cross-sectional envelope 165 is defined by exterior surfaces of the pluggable connector 108. The exterior surfaces that define the cross-sectional envelope 165 may face interior surfaces of the receptacle assembly 104 (FIG. 1) when the pluggable connector 108 is located therein. In the illustrated embodiment, the cross-sectional envelope 165 is substantially rectangular. In some embodiments, the thermal interface region 120 is located within the cross-sectional envelope 165 of the pluggable connector 108. The plate-receiving slots 154 may permit the transfer plates 202 (FIG. 3) to penetrate the cross-sectional envelope 165 of the plug portion 128.

FIG. 2 also shows an enlarged portion of the thermal interface region 120. The transfer plates 152 extend from an interior base surface 168 to the respective exterior edges 162. Each of the transfer plates 152 has plate surfaces 170, 172 that face in opposite directions. At least one of the plate surfaces 170, 172 faces the plate surface of an adjacent transfer plate 152. Each of the transfer plates 152 has a plate height 174 that extends from the base surface 168 to the corresponding exterior edge 162, and a plate width 176 that extends between the plate surfaces 170, 172. The plate height 174 and the plate width 176 are measured transverse to the central axis 194. The plate height 174 is measured along the elevation axis 193, and the plate width 176 is measured along the lateral axis 192.

The plate-receiving slots 154 are defined between opposing plate surfaces or, more specifically, the plate surface 170 of one transfer plate 152 and the plate surface 172 of the adjacent transfer plate 152. In some cases, the plate-receiving slot 154 may be defined between one of the sidewalls 156, 158 and the corresponding plate surface that opposes the sidewall. In the illustrated embodiment, all of the transfer plates 152 have a same plate height 174 and a same plate width 176. When two components have the same height (or other dimension), the two components may be described as having a common height (or other dimension). In other embodiments, the transfer plates 152 may have respective different dimensions.

In some embodiments, the plate-receiving slot 154 has a slot width 195 between adjacent transfer plates 152 that may be less than three times (3×) the plate width 176 of either one of the adjacent transfer plates 152. In particular embodiments, the slot width 195 of the plate-receiving slot 154 may be less than two times (2×) the plate width 176 of either one of the adjacent transfer plates 152. In more particular embodiments, the slot width 195 of the plate-receiving slot 154 may be less than one and a half times (1.5×) the plate width 176 of either one of the adjacent transfer plates 152. By way of example, the plate width 176 may be at most 3.0 mm or, more specifically, at most 2.0 mm. In more particular embodiments, the plate width 176 may be at most 1.5 mm or at most 1.0 mm. The plate height 174 may be at most 20.0 mm or, more specifically, at most 15.0 mm. In more particular embodiments, the plate height 174 may be at most 10.0 mm or, more specifically, at most 8.0 mm. The aforementioned dimensions are merely examples and other dimensions may be used.

Figure 3:
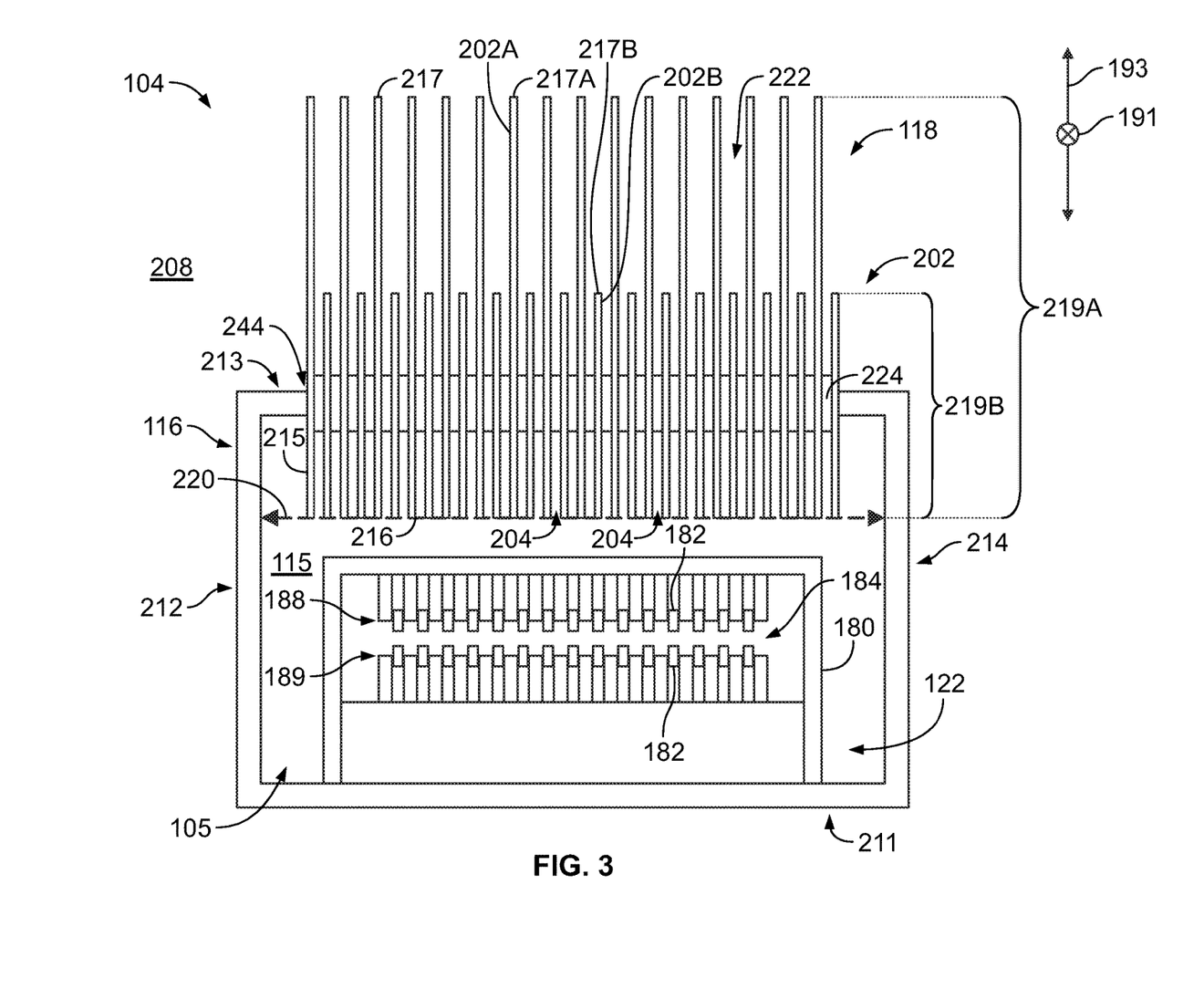
FIG. 3 is an end view of a receptacle assembly in accordance with an embodiment that is configured to receive the pluggable connector.

FIG. 3 is an end view of the receptacle assembly 104 through the communication port 105. As shown, the data connector 122 is disposed within the housing cavity 115 and positioned to engage the pluggable connector 108 (FIG. 1) when the pluggable connector 108 is inserted through the communication port 105 along the mating axis 191. The data connector 122 includes a connector body 180 that holds an array of electrical contacts 182. The connector body 180 defines a board slot 184 that is sized and shaped to receive the board edge 134 (FIG. 1) of the circuit board 132 (FIG. 1) during the mating operation. The electrical contacts 182 extend partially into the board slot 184. When the board edge 134 is received, the electrical contacts 182 may engage the electrical contacts 136 (FIG. 1) of the circuit board 132.

In the illustrated embodiment, the electrical contacts 182 are contact beams that form first and second rows 188, 189. The first and second rows 188, 189 of the electrical contacts 182 oppose each other with the board slot 184 therebetween. When the board edge 134 (FIG. 1) is received by the board slot 184, the board edge 134 may deflect the first and second rows 188, 189 of the electrical contacts 182 away from each other. The electrical contacts 182 may slide along the circuit board 132 until aligning with the corresponding electrical contacts 136 (FIG. 1).

The heat sink 118 includes a series of spaced apart transfer plates 202 that extend parallel to each other and to a plane defined by the mating axis 191 and the elevation axis 193. The transfer plates 202 may be similar to the transfer plates 152 (FIG. 2). Each of the transfer plates 202 has a port edge 215, a cavity edge 216, and an exterior edge 217. The port edge 215 faces in a direction along the mating axis 191 and may initially engage the thermal interface region 120 (FIG. 1) during the mating operation. The port edge 215 may be located at the communication port 105 or located a depth within the housing cavity 115 and face the communication port 105. The cavity edge 216 is disposed within the housing cavity 115, and the exterior edge 217 is located outside of the receptacle assembly 104 in an exterior space 208. The cavity and exterior edges 216, 217 face in opposite directions along the elevation axis 193. The cavity and exterior edges 216, 217 may extend parallel to the mating axis 191.

The transfer plates 202 define a series of plate-receiving slots 204. The plate-receiving slots 204 open toward the communication port 105 and extend parallel to the mating axis 191. The plate-receiving slots 204 are configured to receive the transfer plates 152 (FIG. 2) when the pluggable connector 108 (FIG. 1) is inserted into the housing cavity 115 during the mating operation. The heat sink 118 is configured to transfer thermal energy 150 (FIG. 2) from the pluggable connector 108 through the transfer plates 202 to the exterior space 208.

As shown, the assembly housing 116 has exterior housing sides 211, 212, 213, 214. The housing side 211 may be mounted onto the circuit board 106 (FIG. 1) and, as such, is hereinafter referred to as the mounting side 211. The housing side 213 may be located furthest from the circuit board 106 and, as such, is hereinafter referred to as the elevated side 213. The transfer plates 202 extend from within the housing cavity 115, through the elevated side 213, and into the exterior space 208.

Each of the transfer plates 202 extends between the corresponding cavity edge 216 located within the housing cavity 115 and the corresponding exterior edge 217 located in the exterior space 208. The transfer plates 202 include first (or large) transfer plates 202A and second (or small) transfer plates 202B. The first transfer plates 202A may be larger in size than the second transfer plates 202B. For example, the first transfer plates 202A have plate heights 219A measured along the elevation axis 193 that are greater than plate heights 219B of the second transfer plates 202B. In the illustrated embodiment, the cavity edges 216 are substantially co-planar such that the cavity edges 216 coincide with an edge plane 220. The exterior edges 217, however, are not co-planar. Instead, the exterior edges 217 include exterior edges 217A of the first transfer plates 202A and exterior edges 217B of the second transfer plates 202B. The exterior edges 217A are located further away from the elevated side 213 than the exterior edges 217B.

As shown in FIG. 3, the transfer plates 202 alternate between the first and second transfer plates 202A, 202B. Accordingly, the first and second transfer plates 202A, 202B have a staggered arrangement in the exterior space 208. In such embodiments, flow channels 222 in the exterior space 208 are formed between the first transfer plates 202A having the exterior edges 217A. The flow channels 222 are larger than the plate-receiving slots 204. In some embodiments, a forced airflow may be directed through the flow channels 222 and across the transfer plates 202. The staggered arrangement of the transfer plates 202 in the exterior space 208 may facilitate transferring thermal energy or heat away from the receptacle assembly 104.

Also shown in FIG. 3, the heat sink 118 may include a sink base 224 that couples the transfer plates 202 to one another. In an exemplary embodiment, the sink base 224 and the transfer plates 202 are formed from a common thermally-conductive material, such as copper. The heat sink 118 may be a single unitary component or may be assembled from multiple separate components. The sink base 224 may be positioned within a window 244 of the housing side 213. In some embodiments, the sink base 224 may be formed from separate layers connected by a thermally conductive adhesive. The separate layers may collectively join the transfer plates 202 side-by-side with the plate-receiving slots 204 therebetween. In other embodiments, the heat sink 118 is shaped or formed from a single unitary piece of material that is thermally-conductive.

Figure 4:
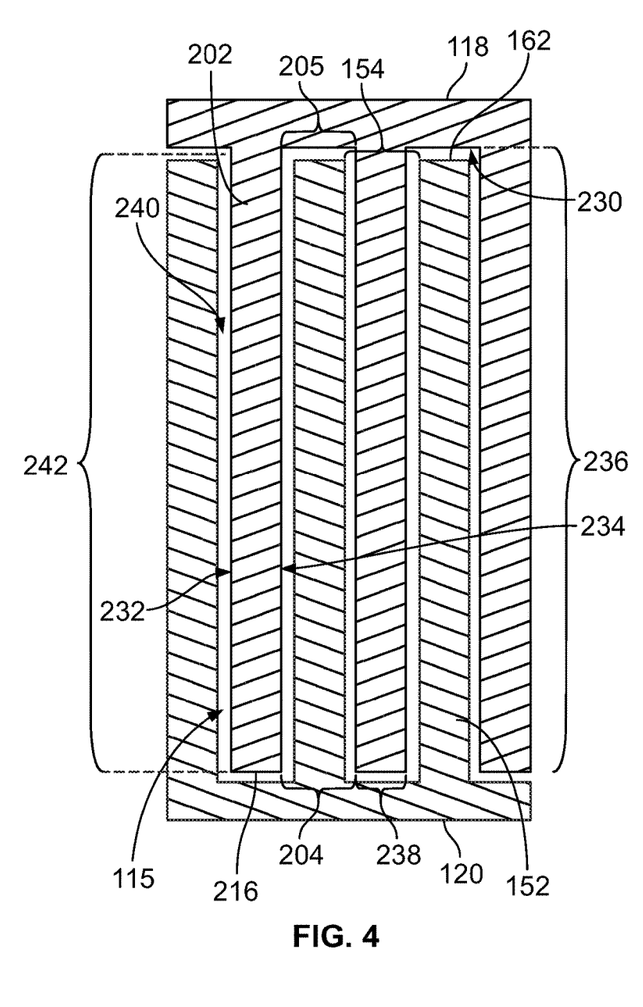
FIG. 4 is an enlarged view illustrating transfer plates of the pluggable connector that are interleaved with transfer plates of the receptacle assembly.

FIG. 4 is an enlarged cross-sectional view of the heat sink 118 and the thermal interface region 120 when the transfer plates 152 and 202 are interleaved with one another. Each of the transfer plates 202 has a cavity portion 242 that is located within the housing cavity 115. The cavity portions 242 of the transfer plates 202 (or the entire transfer plates 202) may have similar dimensions as the transfer plates 152. For example, the cavity portions 242 extend from an interior base surface 230 to the respective cavity edges 216. Each of the transfer plates 202 has plate surfaces 232, 234 that face in opposite directions.

Each of the transfer plates 202 has a plate height 236 that extends from the base surface 230 to the corresponding cavity edge 216, and a plate width 238 that extends between the plate surfaces 232, 234. The plate height 236 and the plate width 238 are measured transverse to the mating axis 191 (FIG. 1). In the illustrated embodiment, all of the transfer plates 202 have a same plate height 236 and a same plate width 238. In other embodiments, the transfer plates 202 may have respective different dimensions. Each of the plate-receiving slots 204 has a slot width 205 between opposing plate surfaces or, more specifically, the plate surface 232 of one transfer plate 202 and the plate surface 234 of the adjacent transfer plate 202.

Similar to the plate-receiving slots 154, in some embodiments, the plate-receiving slot 204 that extends between adjacent transfer plates 202 may have a slot width 205 that is less than three times (3×) the plate width 238 of either one of the adjacent transfer plates 202. In particular embodiments, the plate-receiving slot 204 may have a slot width 205 that is less than two times (2×) the plate width 238 of either one of the adjacent transfer plates 152. In more particular embodiments, the plate-receiving slot 204 may have a slot width 205 that is less than one and a half times (1.5×) the plate width 238 of either one of the adjacent transfer plates 202. By way of example, the plate width 238 may be at most 3.0 mm or, more specifically, at most 2.0 mm. In more particular embodiments, the plate width 238 may be at most 1.5 mm or at most 1.0 mm. The plate height 236 may be at most 20.0 mm or, more specifically, at most 15.0 mm. In more particular embodiments, the plate height 236 may be at most 10.0 mm or, more specifically, at most 8.0 mm. Again, the above dimensions are merely examples and other dimensions may be used.

When the transfer plates 152, 202 are interleaved as shown in FIG. 4, the transfer plates 152 are disposed within the plate-receiving slots 204 and the transfer plates 202 are disposed within the plate-receiving slots 154. The transfer plates 202 extend between the exterior edges 162 of the transfer plates 152. The heat sinks 118 and the thermal interface region 120 may form a relatively snug fit such that an air gap 240 between interfacing transfer plates 152, 202 is less than 0.200 millimeters (mm) or 200 microns. In some embodiments, the air gap 240 may be less than 0.100 mm or 100 microns. In particular embodiments, the air gap 240 may be less than 0.075 mm or 75 microns or, more particularly, less than 0.050 mm or 50 microns.

Compared to plug assemblies that utilize heat blocks, embodiments set forth herein may provide a larger contact area between the thermal interface region and the heat sink. For instance, the planar surfaces of known heat blocks engage each other along a contact area that extends along only two dimensions. Embodiments set forth herein, however, include a thermal interface region and a heat sink that intimately engage each other along three dimensions. Thus, the interleaved transfer plates 152, 202 may form a collective contact area that is much greater than the contact area between flat heat blocks. As such, embodiments may be capable of greater amounts of heat transfer. In some cases, embodiments may achieve greater amounts of heat transfer without providing a normal force to press the thermal interface region 120 and the heat sink 118 together and/or without extra smoothing of the surfaces of the transfer plates 152, 202.

Figure 5:
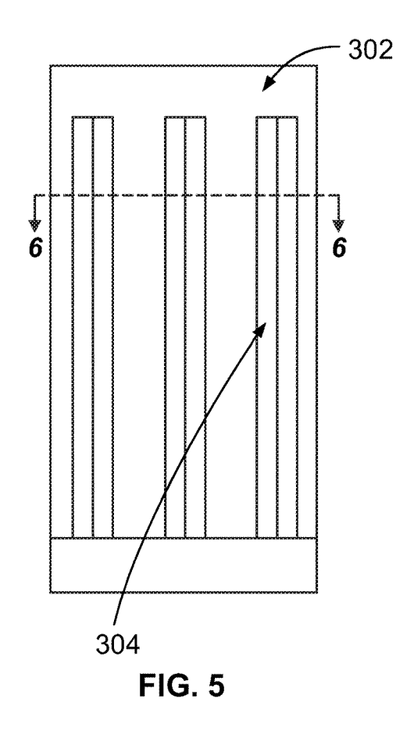
FIG. 5 is an end view of transfer plates formed in accordance with an embodiment.
Figure 6:
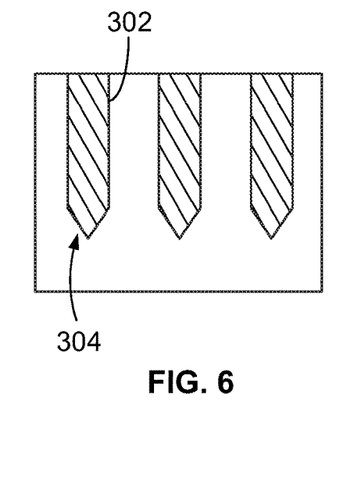
FIG. 6 illustrates a cross-section of the transfer plates of FIG. 5 taken along the line 6-6 in FIG. 5.

FIG. 5 is an enlarged end view of transfer plates 302 formed in accordance with an embodiment that may be used with a thermal interface region of a pluggable connector, such as the thermal interface region 120 (FIG. 1) of the pluggable connector 108 (FIG. 1). FIG. 6 is a cross-section of the thermal transfer plates 302 taken along the line 6-6 in FIG. 5. More specifically, FIGS. 5 and 6 illustrate leading edges 304 of the transfer plates 302. The leading edges 304 are configured to face the receptacle assembly (not shown) during a mating operation. The leading edges 304 may face in a direction that is along a central axis of the pluggable connector, such as the central axis 194 (FIG. 1). In some embodiments, the leading edges 304 may be shaped to facilitate aligning the transfer plates 302 with plate-receiving slots (not shown) of a receptacle assembly, such as the receptacle assembly 104 (FIG. 1). For instance, the leading edges 304 may be chamfered or beveled to guide the transfer plates 302 into the plate-receiving slots. In addition, the port edges of intervening transfer plates, such as the port edges 215 (FIG. 3) of the transfer plates 202 (FIG. 3), may also be beveled or chamfered. In such embodiments in which both the leading edges and the port edges are chamfered, the risk of damaging the transfer plates and/or the thermal interface region or the heat sink is reduced.

In other embodiments, the exterior edges 162 (FIG. 2) and/or the cavity edges 216 (FIG. 4) may be chamfered or beveled. Such embodiments may be used when the heat sink 118 (FIG. 1) is moved toward the thermal interface region 120 (FIG. 1) after the pluggable connector 108 (FIG. 1) has engaged the data connector 122 (FIG. 1). Again, in such embodiments, the risk of damaging the transfer plates and/or the thermal interface region or the heat sink may be reduced. In particular embodiments, the leading edges and the exterior edges of the pluggable connector are chamfered. In other embodiments, only the leading edges are chamfered or only the exterior edges are chamfered. In particular embodiments, the port edges and the cavity edges of the heat sink are chamfered. In other embodiments, only the port edges of the heat sink are chamfered or only the cavity edges of the heat sink are chamfered.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The patentable scope should, therefore, be determined with reference to the appended claims, along with the full scope of equivalents to which such claims are entitled.

As used in the description, the phrase "in an exemplary embodiment" and the like means that the described embodiment is just one example. The phrase is not intended to limit the inventive subject matter to that embodiment. Other embodiments of the inventive subject matter may not include the recited feature or structure. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A connector assembly comprising:
a pluggable input/output (I/O) connector extending between a mating end and a trailing end, the pluggable I/O connector including a connector cavity and internal electronics that are located within the connector cavity, the pluggable I/O connector configured to have a communication cable coupled to the trailing end that is communicatively coupled to the internal electronics, the pluggable I/O connector including a series of spaced apart transfer plates that extend parallel to each other and are exposed to an exterior of the pluggable I/O connector;
a receptacle assembly having an assembly housing that includes a communication port and a housing cavity accessed through the communication port, the receptacle assembly including a data connector disposed within the housing cavity and a heat sink coupled to the assembly housing, the heat sink including a series of spaced apart transfer plates that extend parallel to each other, the transfer plates of the heat sink defining a series of plate-receiving slots of the heat sink within the housing cavity;
wherein the receptacle assembly and the pluggable I/O connector are configured to mate with each other during a mating operation in which the housing cavity receives the pluggable I/O connector through the communication port, the transfer plates of the pluggable I/O connector being positioned within the plate-receiving slots of the heat sink within the housing cavity, the transfer plates of the pluggable I/O connector configured to transfer thermal energy generated by the internal electronics to the transfer plates of the heat sink.

2. The connector assembly of claim 1, wherein the transfer plates of the heat sink extend from within the housing cavity and into an exterior space.

3. The connector assembly of claim 1, wherein the transfer plates of the heat sink include first and second transfer plates, the first and second transfer plates having different heights.

4. The connector assembly of claim 1, wherein the heat sink includes a sink base that couples the transfer plates of the heat sink to one another.

5. The connector assembly of claim 4, wherein a single piece of thermally-conductive material includes the sink base and the transfer plates of the heat sink.

6. The connector assembly of claim 1, wherein the assembly housing includes a housing side having a window, the heat sink being positioned within the window.

7. The connector assembly of claim 1, wherein the pluggable I/O connector is inserted into the housing cavity and advanced along a mating axis, the transfer plates of the thermal interface region of the pluggable I/O connector have leading edges and the transfer plates of the heat sink have port edges, the leading and port edges facing in opposite directions along the mating axis, at least one of the leading edges or the port edges being chamfered, wherein the transfer plates of the pluggable I/O connector advance through the plate-receiving slots of the heat sink during the mating operation.

8. The connector assembly of claim 1, wherein a central axis extends between the loading end and the mating end, the transfer plates of the heat sink extending a height along an elevation axis that is perpendicular to the central axis, wherein the transfer plates of the heat sink are oriented parallel to the central axis and the elevation axis, the connector assembly being devoid of a normal force that presses against the pluggable I/O connector in a direction along the elevation axis.

9. The connector assembly of claim 1, wherein the transfer plates of the pluggable I/O connector and the heat sink are configured such that, for at least a majority of the transfer plates of the pluggable I/O connector, air gaps between the transfer plate of the pluggable I/O connector and two transfer plates of the heat sink are permitted to exist, the air gaps being at most 0.20 millimeters.

10. The connector assembly of claim 1, wherein a central axis extends between the loading end and the mating end and respective base surface areas extend between adjacent transfer plates of the pluggable I/O connector, the transfer plates of the heat sink extending to respective cavity edges along an elevation axis that is perpendicular to the central axis;
wherein, for at least a majority of the transfer plates of the pluggable I/O connector, each side of the transfer plate of the pluggable I/O connector interfaces with one of the transfer plates of the heat sink along an elevated contact region that extends parallel to the central and elevation axes.

11. The connector assembly of claim 10, wherein, for at least a majority of the transfer plates of the heat sink, the cavity edge of the transfer plate of the heat sink interfaces with a corresponding base surface area of the pluggable I/O connector along a linear contact region that extends parallel to the central axis, the elevated contact regions and the linear contact regions collectively forming a three-dimensional contact region in which thermal energy is transferred through from the pluggable I/O connector to the heat sink.

12. The connector assembly of claim 10, wherein the connector assembly is devoid of a normal force that presses against the pluggable I/O connector in a direction along the elevation axis.

13. The connector assembly of claim 1, wherein the transfer plates of the heat sink include first and second transfer plates in which the first transfer plates are larger than the second transfer plates.

14. The connector assembly of claim 1, wherein the pluggable I/O connector includes a circuit board disposed within the connector cavity and having the internal electronics coupled thereto, the internal electronics including at least one of an integrated circuit, signal converter, optical engine, or amplifier, the internal electronics being communicatively coupled to the circuit board such that input data signals and/or output data signals are communicated through the circuit board.

15. A receptacle assembly comprising:
an assembly housing including a communication port and a housing cavity that is accessed through the communication port;
a data connector disposed within the housing cavity and positioned to engage a pluggable connector when the pluggable I/O connector is inserted through the communication port along a mating axis; and
a heat sink coupled to the assembly housing, the heat sink comprising a series of transfer plates that extend parallel to each other and to the mating axis, the transfer plates defining a series of plate-receiving slots that extend parallel to the mating axis and that are positioned to receive heat-transfer plates from the pluggable I/O connector when the pluggable I/O connector is inserted through the communication port, the heat sink configured to transfer thermal energy from the pluggable I/O connector through the transfer plates to an exterior space.

16. The receptacle assembly of claim 15, wherein the assembly housing includes an elevated side, at least some of the transfer plates extending from within the housing cavity, through the elevated side, and into the exterior space.

17. The receptacle assembly of claim 15, wherein each of the transfer plates extends between a corresponding cavity edge located within the housing cavity and a corresponding exterior edge located in the exterior space, the cavity edges being substantially co-planar within the housing cavity.

18. The receptacle assembly of claim 15, wherein the transfer plates have port edges that are located at the communication port or a depth within the housing cavity and face the communication port and have cavity edges that extend parallel to the mating axis, at least one of the port edges or the cavity edges being chamfered and configured to engage the pluggable I/O connector.

19. The receptacle assembly of claim 15, wherein the data connector has a board slot and electrical contacts disposed at least partially within the board slot to engage a board edge of a circuit board.

20. The receptacle assembly of claim 15, wherein the plate-receiving slots are disposed within the housing cavity.

* * * * *